United States Patent
Guan et al.

(10) Patent No.: US 12,147,474 B2
(45) Date of Patent: Nov. 19, 2024

(54) SYSTEM FOR GRAPH NODE SAMPLING AND METHOD IMPLEMENTED BY COMPUTER

(71) Applicant: Alibaba (China) Co., Ltd., Hangzhou (CN)

(72) Inventors: Tianchan Guan, Shanghai (CN); Dimin Niu, Sunnyvale, CA (US); Shuangchen Li, Sunnyvale, CA (US); Honzhong Zheng, Los Gatos, CA (US)

(73) Assignee: Alibaba (China) Co., Ltd., Hangzhou (CN)

(*) Notice: Subject to any disclaimer, the term of this patent is extended or adjusted under 35 U.S.C. 154(b) by 148 days.

(21) Appl. No.: 17/725,275

(22) Filed: Apr. 20, 2022

(65) Prior Publication Data
US 2022/0342934 A1 Oct. 27, 2022

(51) Int. Cl.
*G06F 16/901* (2019.01)
*G06F 3/06* (2006.01)
*G06F 16/22* (2019.01)

(52) U.S. Cl.
CPC ........ *G06F 16/9024* (2019.01); *G06F 3/0679* (2013.01); *G06F 16/2272* (2019.01)

(58) Field of Classification Search
CPC . G06F 16/9024; G06F 16/2272; G06F 3/0679
See application file for complete search history.

(56) References Cited

U.S. PATENT DOCUMENTS

| | | | |
|---|---|---|---|
| 5,970,496 A | 10/1999 | Katzenberger | |
| 8,621,428 B2 | 12/2013 | Massoudi et al. | |
| 9,588,743 B2 | 3/2017 | Massoudi et al. | |
| 9,686,308 B1 | 6/2017 | Srivastava | |
| 9,720,989 B2 | 8/2017 | Theimer et al. | |
| 9,736,182 B1 | 8/2017 | Madhukar et al. | |
| 10,154,066 B1 | 12/2018 | Madhukar et al. | |
| 10,181,957 B2 | 1/2019 | Srivastava | |
| 10,290,017 B2 | 5/2019 | Traasdahl et al. | |
| 10,585,943 B2 | 3/2020 | Kizhakkel et al. | |
| 10,936,965 B2 * | 3/2021 | Savkli | G06F 18/2433 |
| 11,768,754 B2 * | 9/2023 | Zhai | G06F 11/3466 717/127 |
| 2002/0022952 A1 | 2/2002 | Zager et al. | |
| 2003/0131084 A1 | 7/2003 | Pizzorni et al. | |
| 2011/0246483 A1 | 10/2011 | Darr et al. | |
| 2012/0266129 A1 | 10/2012 | Massoudi et al. | |
| 2014/0109038 A1 | 4/2014 | Massoudi et al. | |
| 2015/0161622 A1 * | 6/2015 | Hoffmann | H04L 63/20 705/318 |

(Continued)

*Primary Examiner* — Huawen A Peng (57) ABSTRACT

An embodiment of the present disclosure relates to a graph node sampling system and a computer-implemented method, where structure information of nodes in a graph neural network is stored in a set of data structures, and attribute data of the nodes is stored in another set of data structures. Node sampling may be performed by a sampling unit in a solid state drive. A node sampling unit selects, reads, and collects attribute data of a sampled node and a neighboring node of the sampled node, and transfers the data to a main memory. The method and system according to the embodiments of the present disclosure can save bandwidth consumed by node sampling in large applications such as a graph neural network.

18 Claims, 3 Drawing Sheets

(56) References Cited

U.S. PATENT DOCUMENTS

| | | | |
|---|---|---|---|
| 2015/0324410 A1* | 11/2015 | Glover | G06F 16/9024 707/610 |
| 2016/0055184 A1* | 2/2016 | Fokoue-Nkoutche | G06F 16/213 707/809 |
| 2016/0139894 A1* | 5/2016 | Slesarenko | G06F 9/4552 717/144 |
| 2016/0140245 A1 | 5/2016 | Galbreath et al. | |
| 2017/0147448 A1* | 5/2017 | Kizhakkel | G06F 16/282 |
| 2017/0242625 A1* | 8/2017 | Pandurangan | G06F 3/0659 |
| 2018/0101783 A1* | 4/2018 | Savkli | G06F 18/2433 |
| 2018/0307709 A1* | 10/2018 | Xie | G06F 16/2246 |
| 2019/0286617 A1 | 9/2019 | Abu-Abed et al. | |
| 2020/0320619 A1 | 10/2020 | Motaharian et al. | |
| 2020/0341908 A1* | 10/2020 | Shin | G06F 12/0246 |
| 2022/0138627 A1* | 5/2022 | Todoriki | G06F 18/214 706/12 |
| 2023/0013870 A1* | 1/2023 | Hashimoto | G06N 3/082 |

\* cited by examiner

| 400 | Attribute addr1 | Attr id1 | Attribute addr2 | Attr id2 | ... | Attribute addrn | Attr idn |

FIG. 4

| 500 | Id1 | ... | Idn | Offset1 | ... | Offsetn | data1 | ... | datan |

SYSTEM FOR GRAPH NODE SAMPLING AND METHOD IMPLEMENTED BY COMPUTER

CROSS-REFERENCE TO RELATED APPLICATION

This patent application claims priority to China Patent Application No. 202110456526.0 filed Apr. 26, 2021 by Tianchan GUAN et al., which is hereby incorporated by reference in its entirety.

TECHNICAL FIELD

The present disclosure relates to the field of computers, and in particular, to a graph node sampling system, a non-transitory computer readable medium, and a computer-implemented method.

BACKGROUND

A graph, which is a type of data structure or database, is stored and executed by a computing system, and used for building a set of objects and a model of connections (relationships) between the objects in the set. Each object is represented as a node (or vertex) connected or linked by an edge in the graph. Properties or attributes of an object are associated with a node for representing the object.

Graphs may be used to identify dependency, cluster, similarity, match, category, flow, cost, centrality, etc. in a large data set. Graphs are used in various types of applications, broadly including, but not limited to, graph analytics and graph neural networks (Graph Neural Networks, GNN for short), and more specifically, including applications such as online shopping engines, social networks, recommendation engines, mapping engines (mapping engine), fault analysis, network management, and search engines. Graphs allow for faster retrieval and navigation to a complex hierarchy difficult to model in a relational system.

Graph data typically includes node structure data and attribute data. The node structure data may include, for example, information for identifying nodes (for example, a root node) and information for identifying a neighboring node of a root node (for example, the neighboring node may be linked to the root node by a single edge). The attribute data may include characteristics or attributes of objects, and the characteristic or attribute of an object is associated with a node used for representing the object. For example, if the object represents a person, the characteristics of the person may include age and gender of the person; in this case, the attribute data includes a value characterizing the age and a value characterizing the gender.

Graph data may be stored in one or more solid state drives (Solid State Drive, SSD for short, also referred to as solid state drive) which are connected to a main memory. The node structure data is generally stored separately from the attribute data, because the attribute data may be the same for a plurality of nodes, and the attribute data may be referenced by different nodes, thereby avoiding redundancy and consuming less storage space.

Figure 1:
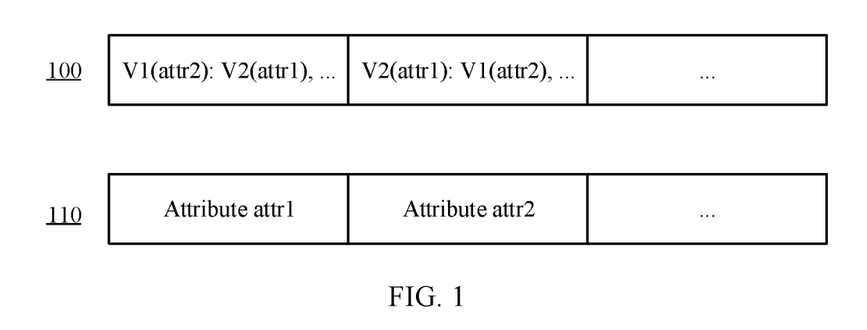
FIG. 1 illustrates an example of a conventional attribute page and a conventional node structure page used to store information of nodes in a graph.

Data is stored as pages in the SSD. FIG. 1 illustrates an example of a conventional structure page 100 storing structural information and a conventional attribute page 110 storing attribute values. In this example, the structure page 100 includes a first entry. The first entry includes a node identifier (identifier, ID for short) of a root node V1 and a node identifier of a neighboring node V2, and is adapted to identify the attribute attr2 of the node V1 and the attribute attr1 of the node V2. In this example, the structure page 100 further includes a second entry. The second entry includes a node identifier (identifier, ID for short) of the root node V2 and a node identifier of the neighboring node V1, and is adapted to identify the attribute attr1 of the node V2 and the attribute attr2 of the node V1. The structure page 100 may include more than two entries, and for each node, each entry may include more than one neighboring node.

In the example shown in FIG. 1, the attribute page 110 includes a plurality of entries, and the plurality of entries contain data (values) for representing the attributes attr1 and attr2. The attribute page 110 may include more than two entries. That is, the attribute page 110 may include attribute data of nodes other than the nodes V1 and V2.

Figure 2:
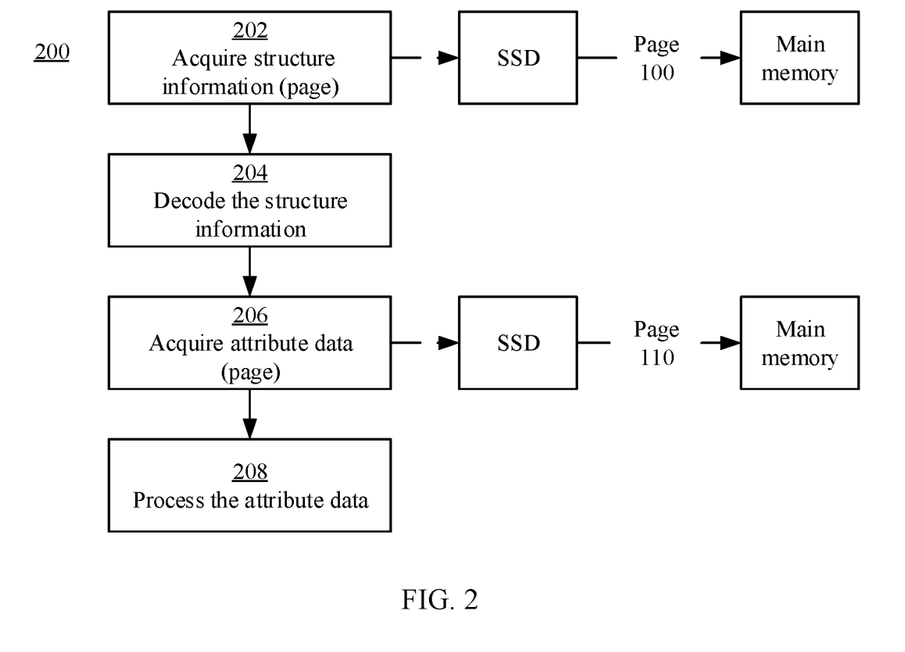
FIG. 2 illustrates a conventional flow of sampling a node in a graph.

FIG. 2 illustrates a conventional process 200 for sampling a node in a GNN. In step 202, a structure page is retrieved from the SSD, where the structure page includes the sampled node. In the example shown in FIG. 2, the node V1 is sampled, so the entire structure page 100 is retrieved (read), and all the structure information in the structure page is transferred from the SSD to the main memory.

In step 204, the structure information is decoded. In step 206, an attribute page is read from the SSD, and the attribute page includes the attributes of the sampled node. In the example shown in FIG. 2, the entire attribute page 110 is read, and all the attribute information in the attribute page is transferred from the SSD to the main memory. In step 208, the attribute data is processed.

A typical page size is 16 kilobytes (Kilobyte, KB). However, the size of the structure data for each node and the size of the attribute data for each node are much smaller than the page size. The size of the structure data of the node can be as small as one byte (Byte) per entry, and the size of the attribute data of the node can be within the range of 10 to 400 bytes per entry.

In the example shown in FIG. 1, for each page, there may be a plurality of entries corresponding to the plurality of nodes, and when data stored in the page is read, the entire page is read. Therefore, the granularity of the SSD is too coarse to allow efficient GNN sampling. More specifically, when sampling a node, it is possible that not all data in the page is needed, but all the data (the entire page) is read (even data of nodes unrelated to the sampled node is read) and transferred to the main memory, even in a case that only part of the data in the page is needed. Therefore, bandwidth is wasted in the operation of transmitting the structure data and attribute data of the unneeded node from the SSD to the main memory.

In an application such as GNN, a graph may include billions of nodes. Therefore, for larger scale applications such as GNN, the amount of wasted bandwidth can be very large. Reducing the amount of bandwidth consumed by GNN sampling is beneficial to facilitate more efficient use of computing resources with fewer computing resources required, resulting in lower costs and energy consumption.

SUMMARY

A solution to the above problem is provided according to embodiments of the present disclosure. Generally, a method and system (for example, a computer system) introduced according to the embodiments of the present disclosure can reduce bandwidth consumed by node sampling in large applications such as a graph neural network.

In some embodiments, information is stored in a first set of data structures (which may be referred to as a set of first data structures herein) and a second set of data structures (which may be referred to as a set of second data structures herein). The information stored in each first data structure includes: a value of an attribute of one or more nodes in a graph, and information for locating data of each attribute in each first data structure. The information stored in each second data structure includes: an address of an attribute of a node subset (for example, the node subset may include a specific node and a neighboring node thereof), and information for locating in the first data structure the attribute (the attribute of the node subset) that is addressed by the address in the second data structure.

More specifically, in some embodiments, the first data structure is a page in a solid state drive (Solid State Drive, SSD for short, also referred to as solid hard disk), and the address in the second data structure is a page number. In response to a command for sampling a specific node (which may be referred to as a root node), the following operations are performed: accessing a second data structure associated with the specific node, to identify a corresponding page number, where the corresponding page number is used to store an attribute of the root node and an attribute of a neighboring node of the root node in the graph; loading a page identified by the corresponding page number; reading the attributes from the loaded page; and transferring to a main memory the attributes that are read from the loaded page. In an embodiment employing an SSD, these operations are performed by the SSD. In some embodiments, the operations are performed by a sampling unit in the SSD.

According to a first embodiment of the present disclosure, a computer-implemented method is provided, including: storing, in a plurality of first data structures in a memory of a computer system, first information associated with a graph, where the graph includes a plurality of nodes, and the first information in each of the first data structures includes: attribute value data, representing a value of an attribute of one or more nodes in the graph, and information for locating the attribute value data of each of the attributes in the first data structure. The computer-implemented method also includes: storing, in a plurality of second data structures in the memory of the computer system, second information associated with the nodes of the graph, where the second information in each of the second data structures includes: an address of an attribute of a node subset of the plurality of nodes, and information for locating, in the first data structure, the attribute addressed by the address.

In some embodiments, each of the second data structures is associated with a corresponding root node in the plurality of nodes, and the node subset includes the corresponding root node and a neighboring node adjacent to the corresponding root node in the graph.

In some embodiments, the memory of the computer system includes a solid state drive.

In some embodiments, the method further includes: receiving a command for sampling a specific node in the plurality of nodes; accessing, in the plurality of second data structures, a second data structure associated with the specific node; and accessing, based on an address in the second data structure associated with the specific node, one or more of the plurality of first data structures.

In some embodiments, the command includes an identifier identifying the specific node, a sampling manner, and a number of neighboring nodes of the specific node to be sampled.

In some embodiments, the memory of the computer system includes a solid state drive, the first data structure includes a page in the solid state drive, and the address in the second data structure includes a page number, and the method further includes: receiving a command for sampling a specific node in the plurality of nodes; accessing, in the plurality of second data structures, a second data structure associated with the specific node, to identify a corresponding page number, where a page identified by the corresponding page number is used to store an attribute of the specific node and an attribute of a neighboring node of the specific node in the graph; loading a page identified by the corresponding page number; reading values of the attributes from the loaded page; and transferring to a main memory of the computer system the values of the attributes that are read from the loaded page, where the main memory is coupled to the solid state drive.

In some embodiments, the command includes an identifier identifying the specific node, a sampling manner, and a number of neighboring nodes of the specific node to be sampled.

In some embodiments, the method further includes: receiving a command for sampling a specific node in the plurality of nodes.

In some embodiments, the method further includes: receiving a command for sampling a specific node in the plurality of nodes; and accessing, in the plurality of second data structures, a second data structure associated with the specific node.

In some embodiments, the method further includes: receiving a command for sampling a specific node in the plurality of nodes; and accessing, based on an address in the second data structure associated with the specific node, one or more of the plurality of first data structures.

In some embodiments, the memory of the computer system includes a solid state drive, the first data structure includes a page in the solid state drive, and the address in the second data structure includes a page number.

In some embodiments, each of the second data structures is associated with a corresponding root node in the plurality of nodes, and the node subset includes the corresponding root node and a neighboring node adjacent to the corresponding root node in the graph.

In some embodiments, the first information further includes an identifier of each of the attributes.

According to a second embodiment of the present disclosure, a system for graph node sampling is provided, including: a processor; and a memory coupled to the processor. The memory is configured to store: a plurality of first data structures used to store first information associated with a graph, where the graph includes a plurality of nodes, and the first information in each of the first data structures includes: attribute value data, representing a value of an attribute of one or more nodes in the graph, and information for locating the attribute value data of each of the attributes in the first data structure. The memory is also configured to store: a plurality of second data structures used to store second information associated with the graph. The second information in each of the second data structures includes: an address of an attribute of a node subset of the plurality of nodes, and information for locating, in the first data structure, the attribute addressed by the address.

In some embodiments, each of the second data structures is associated with a corresponding root node in the plurality of nodes, and the node subset includes the corresponding root node and a neighboring node adjacent to the corresponding root node in the graph.

In some embodiments, the system further includes a controller configured to perform a node sampling process, where the node sampling process responds to a command for sampling a specific node in the plurality of nodes to perform the following operations: accessing, in the plurality of second data structures, a second data structure associated with the specific node; and based on an address in the second data structure associated with the specific node, accessing, in one or more first data structures, an attribute of the specific node and an attribute of a neighboring node of the specific node in the graph.

In some embodiments, the memory includes a main memory and a solid state drive, where the main memory is coupled to the solid state drive.

In some embodiments, the first data structure includes a page in the solid state drive, the address in the second data structure includes a page number, and the solid state drive performs a node sampling process, where the node sampling process responds to a command for sampling a specific node in the plurality of nodes to perform the following operations: accessing a second data structure in the plurality of second data structures, to identify a corresponding page number, where a page identified by the corresponding page number is used to store an attribute of the specific node and an attribute of a neighboring node of the specific node in the graph; loading the page identified by the corresponding page number; reading values of the attributes from the loaded page; and transferring, to a main memory, the values of the attributes that are read from the loaded page.

In some embodiments, the solid state drive includes a sampling unit that receives the command and performs the node sampling process.

In some embodiments, the solid state drive includes a software application programming interface, and the command includes parameters, where the parameters include an identifier identifying the specific node, a sampling manner, and a number of neighboring nodes of the specific node to be sampled, and when the software application programming interface is called, the parameters are written to registers of the solid state drive.

In some embodiments, the first information further includes an identifier of each of the attributes.

According to a third embodiment of the present disclosure, a computer-implemented method is further provided, including: receiving a command for sampling a specific node in a plurality of nodes, where a graph includes the plurality of nodes; and in response to the command, performing the following operations: accessing a second data structure in a memory of a computer system, where the second data structure stores second information, and the second information includes: an address of a first data structure in the memory of the computer system, where the first data structure includes an attribute of the specific node and an attribute of another node, and the another node serves as a neighboring node of the specific node in the graph, and location information for locating, in the first data structure addressed by the address, the attributes of the specific node and the another node. The performing the following operations also includes: accessing the first data structure, where the first data structure stores first information, the first information is associated with the graph, and the first data structure is used to store: attribute value data, representing values of one or more attributes of the specific node and the another node, and information for locating, based on the location information in the second data structure, the attributes in the first data structure.

In some embodiments, the another node is a neighboring node of the node.

In some embodiments, the command includes an identifier identifying the specific node, a sampling manner, and a number of neighboring nodes of the specific node to be sampled.

In some embodiments, the memory of the computer system includes a solid state drive and a main memory, the first data structure includes a page in the solid state drive, and the address in the second data structure includes a page number; the accessing a second data structure includes: identifying a corresponding page number, where a page identified by the corresponding page number is used to store the attribute of the specific node and the attribute of the another node; the accessing the first data structure includes: loading the page identified by the corresponding page number, and reading values of the attributes from the loaded page; and the method further includes transferring to the main memory the values of the attributes that are read from the loaded page.

In some embodiments, the memory of the computer system includes a solid state drive and a main memory, the first data structure includes a page in the solid state drive, and the address in the second data structure includes a page number.

According to a fourth embodiment of the present disclosure, a non-transitory computer readable medium is further provided, storing a set of instructions, where the instructions may be executed by one or more processors of an apparatus, so as to cause the apparatus to implement any method according to the present disclosure.

According to the embodiments of the present disclosure, tasks of processing unnecessary structure data and attribute data are eliminated during node sampling, thereby reducing consumption of bandwidth and other computing resources (such as memory). The sampled attribute data may be directly acquired from the main memory, reducing latency associated with processing operations of the main computer system. Energy consumption is also reduced, because the processor and memory in the solid state drive require less energy than a central processing unit of the main computer system. In general, improvements in computing system functionality can be provided in accordance with the embodiments of the present disclosure.

Persons of ordinary skill in the art will learn the foregoing purposes, other purposes and advantages of the embodiments of the present disclosure after reading the following detailed descriptions of some embodiments illustrated by the accompanying drawings.

BRIEF DESCRIPTION OF THE DRAWINGS

The accompanying drawings included in this specification form a part of the specification, where same/similar reference signs describe same/similar elements. The accompanying drawings display some embodiments of the present disclosure, and are used jointly with specific descriptions to explain the principles of the present disclosure.

DETAILED DESCRIPTION

Reference will be made in detail to various embodiments of the present disclosure, and examples of the embodiments are illustrated in the accompanying drawings. Although descriptions are provided with reference to the embodiments, it should be understood that the descriptions are not intended to limit the present disclosure to these embodiments. Instead, it is the intent of the present disclosure to cover alternative, modified and equivalent solutions that may be included within the spirit and scope of the present disclosure as defined by the appended claims. In addition, in the following detailed descriptions of the present disclosure, many specific details are set forth, in order to provide a thorough understanding of the present disclosure. However, it should be understood that the present disclosure can be practiced without these specific details. On the other hand, well-known methods, processes, components, and circuits are not described in detail to avoid unnecessarily obscuring the aspects of the present disclosure.

Some of the following detailed descriptions are presented based on processes, logic blocks, processing, and operations, which are represented by other symbols, performed on bits of data within a computer memory. These descriptions and representations are methods used by persons skilled in the field of data processing to most effectively communicate the substance of their work to others skilled in the art. In this application, the processes, logic blocks, processing, etc. are conceived as a self-consistent series of steps or instructions leading to a desired result. The steps are physical operations utilizing physical quantities. Generally, though not necessarily, the quantities take the forms of electric or magnetic signals capable of being stored, transmitted, combined, compared, and otherwise manipulated in a computing system. Primarily for the reason of being universal, it has sometimes been proved convenient to refer to the signals as transactions, bits, values, elements, symbols, characters, samples, pixels, etc.

It should be remembered, however, that all these and similar terms should be associated with applicable physical quantities, and are merely convenient markers applied to the quantities. Unless there are additional special notes in the following discussions, it should be understood that throughout the present disclosure, discussions using terms such as "access", "store", "sample", "send", "write", "read", "transfer/transmit", "receive", and "load", refer to actions and processes (for example, the methods shown in FIG. 6 and FIG. 7) of a device or computing system or similar electronic computing device or system (for example, the system shown in FIG. 3). A computing system or similar electronic computing device operates and transforms data represented as physical (electrical) quantities within a memory, register, or another such device used for information storage, transmission or display.

Some of the components or embodiments described herein may be discussed in the general context of computer executable instructions present in some form of computer readable storage medium (for example, a program module) executed by one or more computers or other devices. As an example and not limitation, computer readable storage medium may include non-transitory computer storage medium and communication medium. Generally, a program module includes a routine, a procedure, an object, a component, a data structure, etc. that perform a specific task or implement a specific abstract data type. In various embodiments, the functions of the program module may be combined or distributed as required.

Computer storage media include volatile and non-volatile, removable and non-removable media in any method or technology for storing information (such as computer readable instructions, data structures, program modules or other data, etc.). Computer storage media include, but are not limited to, a double data rate (Double Data Rate, DDR for short) memory, a random access memory (Random Access Memory, RAM for short), a static random access memory (Static Random Access Memory, SRAM for short), or a dynamic random access memory (Dynamic Random Access Memory, DRAM for short), a read only memory (Read Only Memory, ROM for short), an electrically erasable programmable read only memory (Electrically Erasable Programmable Read Only Memory, EEPROM for short), a flash memory (Flash Memory, such as SSD) or other memory technologies, a compact disk read only memory (Compact Disk Read Only Memory, CD-ROM for short), a digital versatile disk (Digital Versatile Disk, DVD for short) or other optical memories, a magnetic cassette (Magnetic Cassette), a magnetic tape (Magnetic Tape), a magnetic disk storage (Magnetic Disk Storage) or other magnetic storage devices, or any other media that can be used for storing required information and can be accessed for retrieval of such information.

Communication media may embody a computer executable instruction, a data structure and a program module, and include any messaging medium. As an example but not limitation, communication media include wired media such as wired networks or direct wired connections, and wireless media such as acoustic, radio frequency (Radio Frequency, RF), infrared and other wireless media. A combination of any of the above may also be included in the scope of computer readable media.

Figure 3:
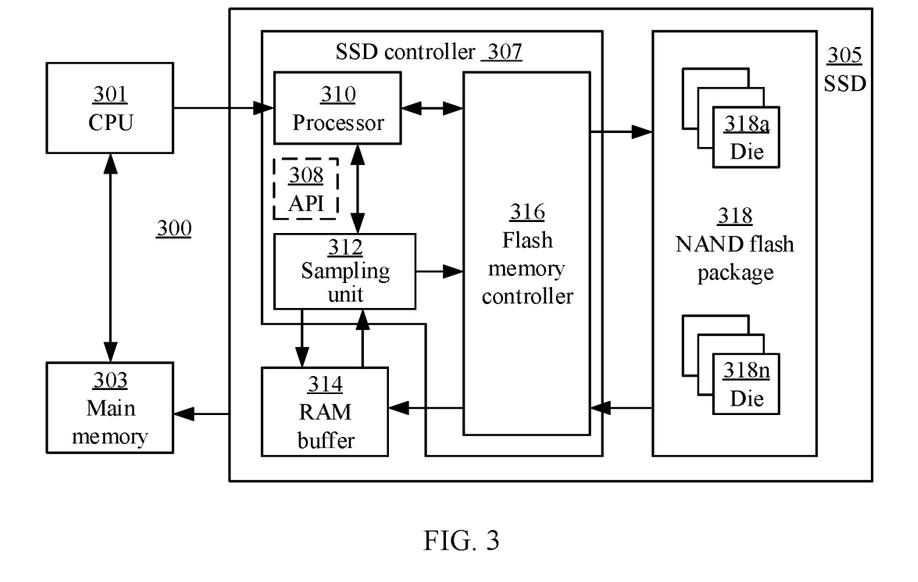
FIG. 3 illustrates a block diagram of an example of a system capable of implementing one or more embodiments according to the present disclosure.

FIG. 3 illustrates a block diagram of an example of a system 300 (for example, a computing system) on which one or more embodiments according to the present disclosure can be implemented. The system 300 may include elements or components in addition to those shown and described below, and the elements or components may be coupled in the manner shown or in different manners. Some of the blocks in the example system 300 are described according to functions they perform. Although described and illustrated as separate blocks, the present disclosure is not limited thereto, meaning, for example, a combination of the blocks/functions may be integrated into a single block for performing a plurality of functions.

Figure 6:
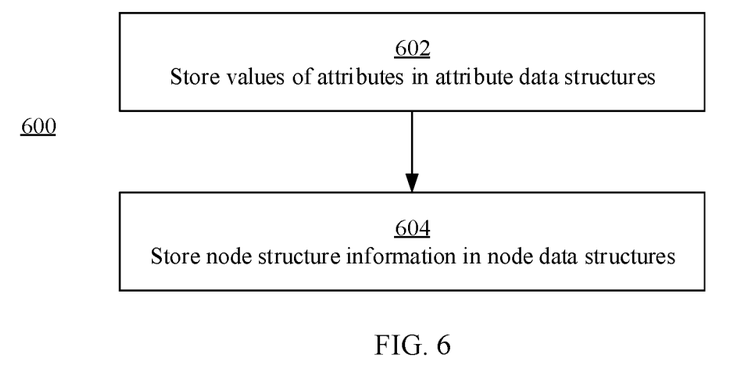
FIG. 6 is a flowchart of an example of a method for node sampling in an embodiment according to the present disclosure.
Figure 7:
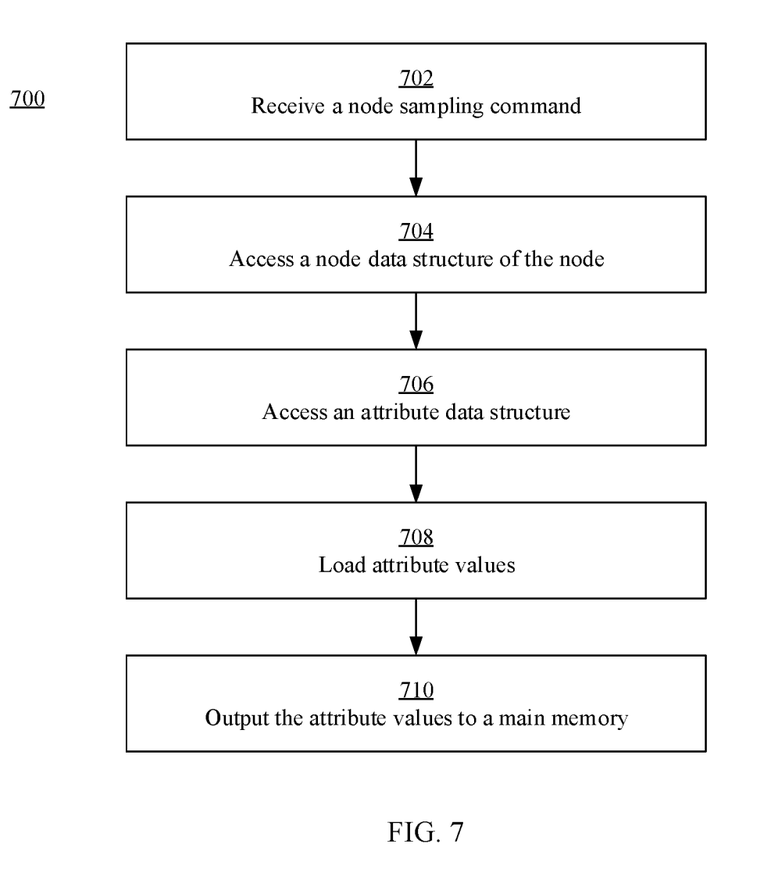
FIG. 7 is a flowchart of an example of another method for node sampling in an embodiment according to the present disclosure.

In an embodiment, the system 300 is an example of a system for implementing the methods disclosed herein (for example, the methods shown in FIG. 6 and FIG. 7). In the example of FIG. 3, the system 300 includes a central processing unit (Central Processing Unit, CPU) 301, a main memory 303 and a solid state drive (Solid State Drive, SSD) 305. For example, the main memory 303 may be a DRAM. The SSD 305 further includes a RAM buffer 314.

The SSD 305 includes a plurality of storage elements, specifically, a plurality of dies (die) or chips (chip) 318a to 318n for storing data. In an embodiment, the dies 318a to 318n are NAND dies, so the SSD 305 may be referred to as a NAND flash device, the plurality of dies may be referred to as a NAND flash package (package) 318. The NAND flash package 318 is used for storing data pages that include node structure data (e.g., refer to FIG. 4) and attribute data (e.g., refer to FIG. 5).

The SSD 305 in FIG. 3 further includes an SSD controller 307, the SSD controller 307 includes a processor 310 and a flash memory controller 316. Importantly, in contrast to a conventional SSD controller, the SSD controller 307 further includes a sampling unit 312 located in a read path. In the embodiment shown in FIG. 3, the sampling unit 312 is a hardware unit within the SSD controller 307; however, the present disclosure is not limited thereto. Generally, the sampling unit 312 is used for supporting or processing sampling of a node in a graph of a graph neural network (GNN).

The processor 310 receives a command from the CPU 301, and passes the command to the flash controller 316 and the sampling unit 312. In some embodiments, dedicated sampling commands are used for node sampling. Each sampling command includes parameters, the parameters include an identifier (identifier, ID for short) of a node being sampled (which may be referred to as a node of interest or a root node), and further include: information for identifying a sampling manner, and a number of neighboring nodes of the root node that need to be sampled. The neighboring nodes of the root node are nodes that are separated from the root node by a defined number of edges (for example, one edge). The sampling manners include, for example, random sampling and weighted sampling.

In some embodiments, the SSD controller 307 includes a software application programming interface (Application Programming Interface, API for short) 308. The processor 310 passes the sampling command to the sampling unit 312, and writes the command parameters to appropriate registers when the software application programming interface 308 is called.

Figure 4:
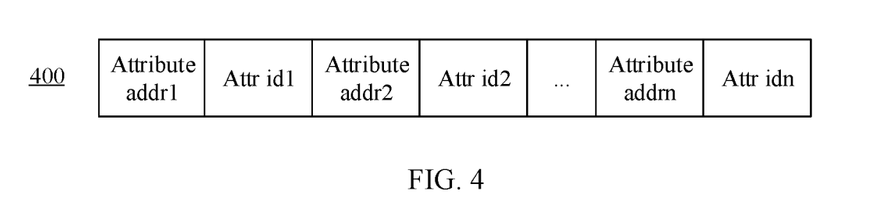
FIG. 4 illustrates an example of a data structure which includes node structure information, in an embodiment according to the present disclosure.

FIG. 4 illustrates an example of a data structure 400 that includes structure information (data) of a node (root node) in an embodiment according to the present disclosure. The data structure 400 may also be referred to herein as a node data structure or a second data structure.

Node data structures similar to the data structure 400 are associated with nodes of the graph of the GNN. In other words, each node in the graph may be identified by a corresponding node ID, and the node ID of a node may be used for identifying and accessing a data structure 400 associated with the node. In the SSD embodiment, the node data structure 400 is a page in the NAND flash package 318 (FIG. 3).

In the embodiment shown in FIG. 4, the node data structure 400 includes: an address of an attribute (for example, the "Attribute addr1") associated with the root node, and an address of an attribute associated with a neighboring node of the root node. The node data structure 400 further includes location information, which may be used for locating the value (which may be represented by attribute value data) of each attribute in the attribute data structure (used for storing the attribute value data). The location information may be IDs of the attributes (for example, "Attr id1") and/or offset values of the attributes. The node data structure 400 may further include other information associated with GNN sampling, such as (without limitation) node degree (node degree) and edge weight (edge weight).

Figure 5:
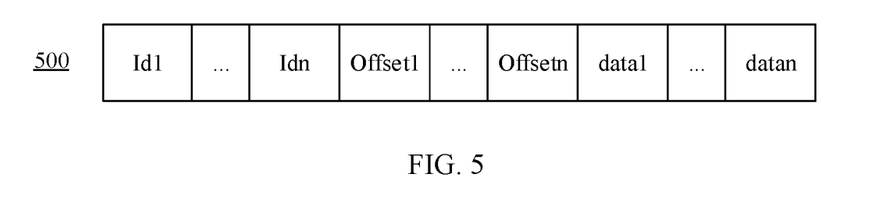
FIG. 5 illustrates an example of a data structure which includes attribute data corresponding to a node, in an embodiment according to the present disclosure.

In some embodiments, the attribute data is stored in a data structure similar to a data structure 500 shown in FIG. 5. In embodiments employing an SSD, the data structure 500 is a page in one of the dies in the NAND flash package 318 (FIG. 3) and the addresses (for example, the "Attribute addr1") in the data structure 400 are page numbers.

FIG. 5 illustrates an example of the data structure 500 that includes data representing node attributes in an embodiment in accordance with the present disclosure. In the embodiment shown in FIG. 5, the attribute data structure 500 includes attribute IDs (for example, "Id1") of the attributes stored in the data structure, corresponding offset values (for example, the "Offset1") associated with the attribute IDs, and a value (data, for example, "data1") of each attribute ID of the attributes.

Referring back to FIG. 3, a sampling command is used for identifying a node (root node) to be sampled, and in response to the sampling command, the sampling unit 312 accesses or reads (obtains) structure data of the node from the node data structure 400 (FIG. 4) of the node.

More specifically, in some embodiments, the node structure data 400 of the root node includes page numbers, the attribute data of the root node is stored in the NAND dies 318 (FIG. 3), and the storage locations correspond to the page numbers, so the sampling unit 312 obtains the page numbers from the node structure page.

The structure data of the root node may further identify a neighboring node of the root node. Therefore, the sampling unit 312 may further obtain the page numbers corresponding to the attribute data of the neighboring node, where these page numbers correspond to storage locations of the attribute data of the neighboring node in the NAND flash package 318.

The sampling unit 312 then controls the flash memory controller 316 such that the flash memory controller 316 loads the pages for the attribute data identified by the page numbers. FIG. 5 illustrates an embodiment of a data structure including attribute data.

Referring back to FIG. 3, the pages for the attribute data (including the attribute data of the sampled neighboring node and the attribute data of the root node) are loaded into the RAM buffer 314 via the flash memory controller 316. These pages may also include attribute data of nodes other than the root node and the sampled neighboring node. In any case, the sampling unit 312 later selects, reads, and collects only the attribute data of the root node and the sampled neighboring node, and outputs this attribute data to the main memory 303. In some embodiments, the sampling unit 312 may output the selected and collected attribute data to the RAM buffer 314, and the data is later written to the main memory 303.

Compared with the conventional method and system, embodiments according to the present disclosure consume less bandwidth and storage space. More specifically, by performing sampling in the SSD 305 (e.g., in the sampling unit 312), the amount of data transferred to the main memory 303 is reduced, thereby reducing the consumption of storage space and bandwidth. In some cases, up to 50% of bandwidth can be saved.

Furthermore, since the attribute data in the main memory 303 is just the attribute data associated with the sampled node and the neighboring node of the sampled node, the data can be accessed directly without additional processing by the CPU 301. The latency associated with the additional processing is avoided. Moreover, energy consumption of the system 300 is reduced because the processing and storage elements in the SSD 305 consume less energy than the CPU 301. In general, improvements in computing system functionality can be provided in accordance with the embodiments of the present disclosure.

FIG. 6 is a flowchart 600 of an example of a node sampling method according to some embodiments in the present disclosure. All or some of the operations represented by the boxes in the flowchart 600 may be implemented as computer executable instructions present on some form of non-transitory computer-readable storage medium, and may be executed by, for example, the system 300 shown in FIG. 3.

In the box 602 shown in FIG. 6, information is stored in a first set of data structures (which may be referred to herein as a set of first data structures or attribute data structures; for example, the data structure 500 shown in FIG. 5). The information stored in each first data structure includes: a value of an attribute of one or more nodes in the graph, and information for locating data of each attribute in each first data structure.

In the box 604 shown in FIG. 6, information is stored in a second set of data structures (which may be referred to herein as a set of second data structures or node data structures; for example, the data structure 400 shown in FIG. 4). Information stored in each second data structure includes: an address of an attribute of a node subset (which, for example, may include a specific node and a neighboring node thereof), and information used for locating, in the first data structure, the attribute (the attribute of the node subset) addressed by the address in the second data structure.

FIG. 7 is a flowchart 700 of an example of a node sampling method according to the embodiments in the present disclosure. All or some of the operations represented by the boxes in the flowchart 700 may be implemented as computer executable instructions present on some form of non-transitory computer-readable storage medium, and are executed by, for example, the system 300 shown in FIG. 3. In some embodiments, the operations shown in FIG. 7 are performed by the SSD 305 shown in FIG. 3, and more specifically, may be performed by the sampling unit 312.

In the box 702 shown in FIG. 7, a command for sampling a specific node (a root node) is received.

In the box 704, in response to the command, a node data structure (a second data structure; for example, the data structure 400 shown in FIG. 4) associated with the root node is accessed. The second data structure includes an address of an attribute of the root node, and an address of an attribute of another node that serves as a neighboring node of the root node in the graph. In an embodiment employing an SSD, the address is a page number, and the data structure 400 (FIG. 4) is accessed in order to identify a page number used for storing the attribute of the root node, and a page number used for storing the attribute of the neighboring node of the root node in the graph.

In the box 706 shown in FIG. 7, an attribute data structure (a first data structure; for example, the data structure 500 shown in FIG. 5) addressed by the second data structure in the box 704 is accessed. The first data structure includes attribute value data, representing values of the attributes of the neighboring node and the root node. In an embodiment employing an SSD, pages identified by the page numbers are loaded.

In the box 708, the attribute value data is read from the loaded first data structure (page). More specifically, based on the location information (for example, the offset values and/or attribute IDs) in the second data structure, only the attribute value data of the root node and the sampled neighboring node are selected, read and collected.

In the box 710, the selected, read and collected attribute value data is output (for example, the attribute value data is transferred to the main memory, or to the buffer and then to the main memory).

In summary, according to the embodiments of the present disclosure, tasks of processing unnecessary structure data and attribute data are eliminated during node sampling, thereby reducing the consumption of bandwidth and other computing resources (for example, storage space). The attribute data can be retrieved by directly accessing the main memory, which reduces the latency associated with the processing of the main computer system. The consumed energy is also reduced, because the processor and memory in the solid state drive require less energy than a central processing unit of the main computer system. In general, improvements in computing system functionality can be provided in accordance with the embodiments of the present disclosure.

While the foregoing disclosure illustrates various embodiments by using specific block diagrams, flowcharts and examples, each block diagram element, flowchart step, operation and/or component described and/or illustrated herein may be implemented individually and/or collectively by using a wide range of configurations. In addition, any disclosure of a component contained within another component should be considered exemplary, as the same function may be implemented through many other architectures.

Although the subject matter has been described in a language specific for structural features and/or methodological actions, it should be understood that, the subject matter defined in the present disclosure is not necessarily limited to the specific features or actions described herein. On the contrary, the specific features and actions described herein are disclosed as example embodiments of implementing the present disclosure.

The embodiments according to the present disclosure are described as such. Although the present disclosure includes the description of specific embodiments, the present disclosure should not be construed as limited by these embodiments, but should be construed in accordance with the appended claims.

What is claimed is:

1. A computer-implemented method, comprising:
   storing, in a plurality of first data structures in a memory of a computer system, first information associated with a graph, wherein the graph comprises a plurality of nodes, and wherein the first information in each of the first data structures comprises:
   attribute value data, representing a value of an attribute of one or more nodes in the graph; and
   information for locating the attribute value data of each of the attributes in the first data structure; and
   storing, in a plurality of second data structures in the memory of the computer system, second information associated with the nodes of the graph, wherein the second information in each of the second data structures comprises:
   an address of an attribute of a node subset of the plurality of nodes; and
   information for locating, in the first data structure, the attribute addressed by the address,
   wherein each of the second data structures is associated with a corresponding root node in the plurality of nodes, and wherein the node subset comprises the corresponding root node and a neighboring node adjacent to the corresponding root node in the graph.

2. The computer-implemented method of claim 1, further comprising:
receiving a command for sampling a specific node in the plurality of nodes;
accessing, in the plurality of second data structures, a second data structure associated with the specific node; and
accessing, based on an address in the second data structure associated with the specific node, one or more of the plurality of first data structures.

3. The computer-implemented method of claim 1, wherein the memory of the computer system comprises a solid state drive, wherein the first data structure comprises a page in the solid state drive, wherein the address in the second data structure comprises a page number, and wherein the method further comprises:
receiving a command for sampling a specific node in the plurality of nodes;
accessing, in the plurality of second data structures, a second data structure associated with the specific node, to identify a corresponding page number, wherein a page identified by the corresponding page number is used to store an attribute of the specific node and an attribute of a neighboring node of the specific node in the graph;
loading the page identified by the corresponding page number;
reading values of the attributes from the loaded page; and
transferring, to a main memory of the computer system, the values of the attributes that are read from the loaded page, wherein the main memory is coupled to the solid state drive.

4. The computer-implemented method of claim 1, further comprising:
receiving a command for sampling a specific node in the plurality of nodes.

5. The computer-implemented method of claim 1, further comprising:
receiving a command for sampling a specific node in the plurality of nodes; and
accessing, in the plurality of second data structures, a second data structure associated with the specific node.

6. The computer-implemented method of claim 1, further comprising:
receiving a command for sampling a specific node in the plurality of nodes; and
accessing, based on an address in the second data structure associated with the specific node, one or more of the plurality of first data structures.

7. The computer-implemented method of claim 1, wherein the memory of the computer system comprises a solid state drive, wherein the first data structure comprises a page in the solid state drive, and wherein the address in the second data structure comprises a page number.

8. The computer-implemented method of claim 1, wherein the first information further comprises an identifier of each of the attributes.

9. A system for graph node sampling, comprising:
a processor; and
a memory coupled to the processor, wherein the memory is configured to store:
a plurality of first data structures used to store first information associated with a graph, wherein the graph comprises a plurality of nodes, and wherein the first information in each of the first data structures comprises:
attribute value data, representing a value of an attribute of one or more nodes in the graph; and
information for locating the attribute value data of each of the attributes in the first data structure; and
a plurality of second data structures used to store second information associated with the nodes of the graph, wherein the second information in each of the second data structures comprises:
an address of an attribute of a node subset of the plurality of nodes; and
information for locating, in the first data structure, the attribute addressed by the address,
wherein each of the second data structures is associated with a corresponding root node in the plurality of nodes, and wherein the node subset comprises the corresponding root node and a neighboring node adjacent to the corresponding root node in the graph.

10. The system of claim 9, further comprising a controller configured to perform a node sampling process, wherein the node sampling process responds to a command for sampling a specific node in the plurality of nodes to perform the following operations:
accessing, in the plurality of second data structures, a second data structure associated with the specific node; and
based on an address in the second data structure associated with the specific node, accessing, in one or more first data structures, an attribute of the specific node and an attribute of a neighboring node of the specific node in the graph.

11. The system of claim 9, wherein the memory comprises a main memory and a solid state drive, wherein the main memory is coupled to the solid state drive.

12. The system of claim 11, wherein the first data structure comprises a page in the solid state drive, wherein the address in the second data structure comprises a page number, wherein the solid state drive performs a node sampling process, and wherein the node sampling process responds to a command for sampling a specific node in the plurality of nodes to perform the following operations:
accessing a second data structure in the plurality of second data structures, to identify a corresponding page number, wherein a page identified by the corresponding page number is used to store an attribute of the specific node and an attribute of a neighboring node of the specific node in the graph;
loading the page identified by the corresponding page number;
reading values of the attributes from the loaded page; and
transferring, to a main memory, the values of the attributes that are read from the loaded page.

13. The system of claim 12, wherein the solid state drive comprises a sampling unit that receives the command and performs the node sampling process.

14. The system of claim 13, wherein the solid state drive comprises a software application programming interface and the command comprises parameters, wherein the parameters comprise an identifier identifying the specific node, a sampling manner, and a number of neighboring nodes of the specific node to be sampled, and when the software application programming interface is called, the parameters are written to registers of the solid state drive.

15. The system of claim 9, wherein the first information further comprises an identifier of each of the attributes.

16. A computer-implemented method, comprising:

receiving a command for sampling a specific node in a plurality of nodes, wherein a graph comprises the plurality of nodes; and in response to the command, performing the following operations:

accessing a second data structure in a memory of a computer system, wherein the second data structure stores second information, and wherein the second information comprises:

an address of a first data structure in the memory of the computer system, wherein the first data structure comprises an attribute of the specific node and an attribute of another node, and wherein the another node serves as a neighboring node of the specific node in the graph; and         location information for locating, in the first data structure addressed by the address, the attributes of the specific node and the another node; and     accessing the first data structure, wherein the first data structure stores first information, wherein the first information is associated with the graph, and wherein the first data structure is used to store:

attribute value data, representing values of one or more attributes of the specific node and the another node; and         information for locating, based on the location information in the second data structure, the attributes in the first data structure.

17. The computer-implemented method of claim 16, wherein the memory of the computer system comprises a solid state drive and a main memory, wherein the first data structure comprises a page in the solid state drive, and wherein the address in the second data structure comprises a page number;

wherein the accessing the second data structure comprises: identifying a corresponding page number, wherein a page identified by the corresponding page number is used to store the attribute of the specific node and the attribute of the another node;

wherein the accessing the first data structure comprises: loading the page identified by the corresponding page number, and reading values of the attributes from the loaded page; and     wherein the method further comprises transferring, to the main memory, the values of the attributes that are read from the loaded page.

18. The computer-implemented method of claim 16, wherein the memory of the computer system comprises a solid state drive and a main memory, wherein the first data structure comprises a page in the solid state drive, and wherein the address in the second data structure comprises a page number.

* * * * *